US012567200B2

(12) United States Patent
Ko et al.

(10) Patent No.: US 12,567,200 B2
(45) Date of Patent: Mar. 3, 2026

(54) COMPUTING VIEWABILITY OF OBJECTS WITHIN VIRTUAL EXPERIENCES

(71) Applicant: Roblox Corporation, San Mateo, CA (US)

(72) Inventors: Scott Ko, Dublin, CA (US); Junliang Liu, Santa Clara, CA (US)

(73) Assignee: Roblox Corporation, San Mateo, CA (US)

( * ) Notice: Subject to any disclaimer, the term of this patent is extended or adjusted under 35 U.S.C. 154(b) by 253 days.

(21) Appl. No.: 18/226,076

(22) Filed: Jul. 25, 2023

(65) Prior Publication Data

US 2025/0037351 A1     Jan. 30, 2025

(51) Int. Cl.
| | |
|---|---|
| *G06T 15/20* | (2011.01) |
| *A63F 13/52* | (2014.01) |
| *G06T 3/60* | (2024.01) |
| *G06T 15/06* | (2011.01) |

(52) U.S. Cl.
CPC .............. *G06T 15/20* (2013.01); *A63F 13/52* (2014.09); *G06T 3/60* (2013.01); *G06T 15/06* (2013.01)

(58) Field of Classification Search
CPC ......... G06F 30/13; G06F 30/20; G06Q 30/02; G06Q 30/0202; G06Q 30/0242; G06Q 30/0244; G06Q 30/0246; G06Q 30/0255; G06Q 30/0261; G06Q 30/0277; G06T 15/06; G06T 15/20; G06T 7/215; G06T 7/292; G06T 7/70; G06T 2207/30244; A63F 13/52
See application file for complete search history.

(56) References Cited

U.S. PATENT DOCUMENTS

| | | | |
|---|---|---|---|
| 8,407,090 B2 * | 3/2013 | Kitchen .................. | A63F 13/52 705/14.43 |
| 2006/0200378 A1 * | 9/2006 | Sorensen ............. | G06Q 10/063 705/7.29 |
| 2008/0254896 A1 * | 10/2008 | Sispoidis ............... | G06Q 30/02 463/43 |
| 2020/0034682 A1 * | 1/2020 | Ohori ..................... | G06Q 90/20 |
| 2024/0095778 A1 * | 3/2024 | Petruzzelli ......... | G06Q 30/0242 |

* cited by examiner

*Primary Examiner* — Lawrence S Galka

(74) *Attorney, Agent, or Firm* — IP Spring

(57)     ABSTRACT
Some implementations related to methods, systems, and computer-readable media for determining object viewability within a multi-dimensional virtual experience. In some implementations, a computer-implemented method includes placing at least one bot at one or more virtual locations in the multi-dimensional virtual experience; rotating a viewport through one or more orientations; and at the one or more orientations, and for one or more objects located in the multi-dimensional virtual experience, determining a viewability of the one more objects from the vantage of the at least one bot; and for the one or more objects, calculating a viewability as a function of the determined viewability; and generating a data structure comprised of the viewability of the one or more objects.

19 Claims, 8 Drawing Sheets

400

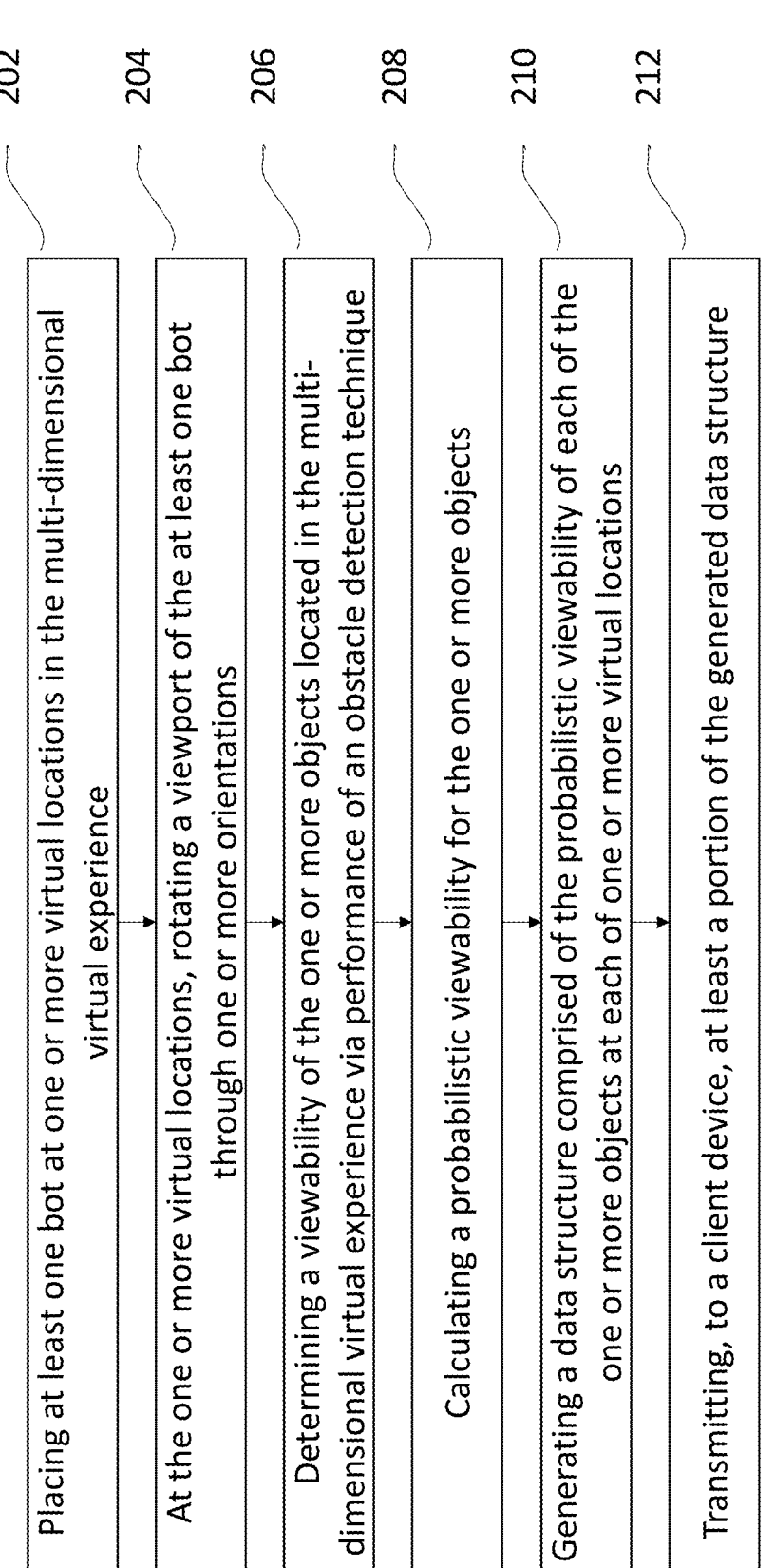

202

Placing at least one bot at one or more virtual locations in the multi-dimensional virtual experience

204

At the one or more virtual locations, rotating a viewport of the at least one bot through one or more orientations

206

Determining a viewability of the one or more objects located in the multi-dimensional virtual experience via performance of an obstacle detection technique

208

Calculating a probabilistic viewability for the one or more objects

210

Generating a data structure comprised of the probabilistic viewability of each of the one or more objects at each of one or more virtual locations

212

Transmitting, to a client device, at least a portion of the generated data structure

Fig 2

| Virtual Location of Vantage Point | | Orientation | Object Viewability | | |
|---|---|---|---|---|---|
| x | y | Angle of FOV | Rectangle | Oval | Triangle |
| 0 | 4 | 90 | 1 | 0 | 0 |
| 4 | 1 | 180 | 1 | 1 | 1 |
| 4 | 7 | 0 | 1 | 1 | 1 |
| 8 | 4 | 270 | 0 | 0 | 1 |

450

| Object | Probabilistic Viewability |
|---|---|
| Rectangle | 0.75 |
| Oval | 0.5 |
| Triangle | 0.75 |

480

400

602

Receiving, from a client device, a request to determine validity of an impression

604

Identifying, using the data structure, a probability that the advertising impression is a valid impression

606

Outputting the probablity the impression is a valid impression

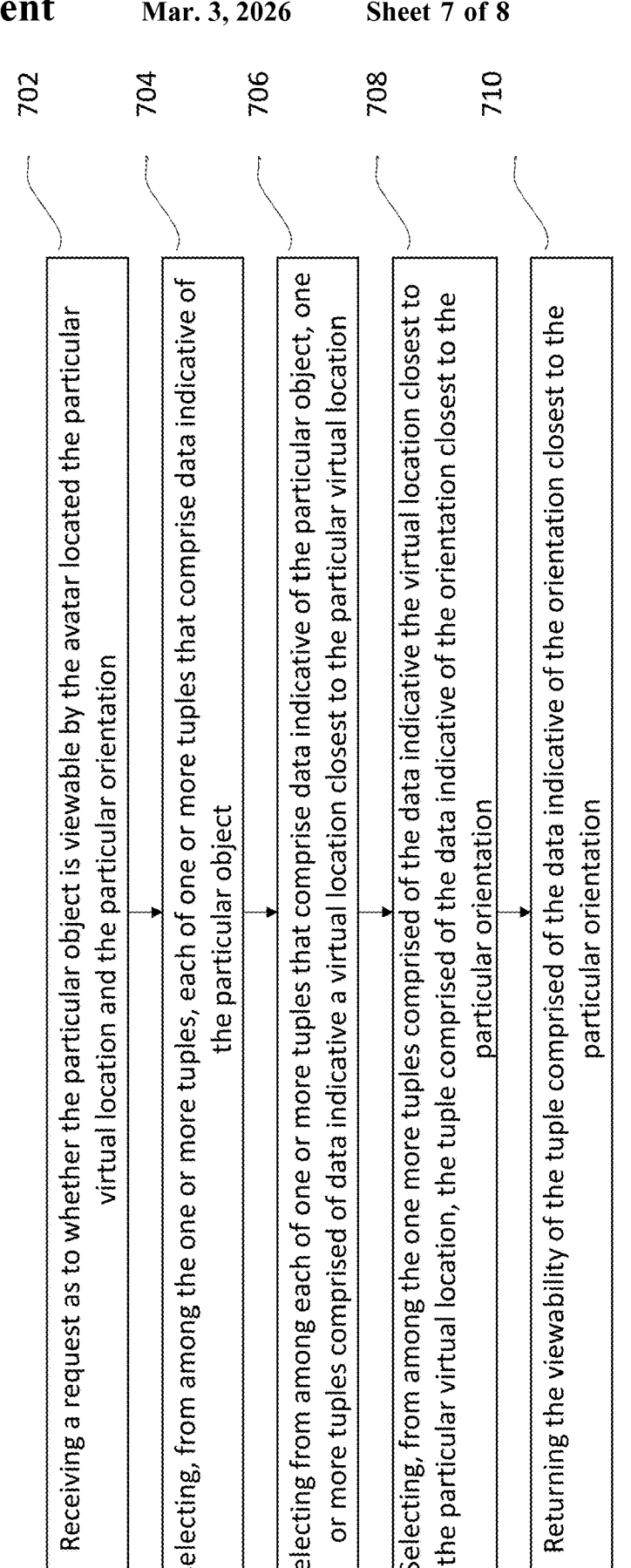

702 Receiving a request as to whether the particular object is viewable by the avatar located the particular virtual location and the particular orientation 704 Selecting, from among the one or more tuples, each of one or more tuples that comprise data indicative of the particular object 706 Selecting from among each of one or more tuples that comprise data indicative of the particular object, one or more tuples comprised of data indicative a virtual location closest to the particular virtual location 708 Selecting, from among the one more tuples comprised of the data indicative the virtual location closest to the particular virtual location, the tuple comprised of the data indicative of the orientation closest to the particular orientation 710 Returning the viewability of the tuple comprised of the data indicative of the orientation closest to the particular orientation

COMPUTING VIEWABILITY OF OBJECTS WITHIN VIRTUAL EXPERIENCES

TECHNICAL FIELD

Embodiments relate generally to online virtual experience platforms, and more particularly, to methods, systems, and computer readable media to determine a probabilistic viewability of an object in a virtual experience.

BACKGROUND

The digital age has witnessed a significant transition from traditional advertising to digital advertising. However, Applicant has discovered many problems with current methods related to digital advertising Through effort and innovation, Applicant has solved many of those problems with solutions embodied herein.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this disclosure are directed to methods, systems, and computer readable media directed to the computation of a probabilistic viewability of one or more objects within a multi-dimensional virtual experience.

According to one aspect, a computer-implemented method for determining object viewability is described, the computer-implemented method determining object viewability, the method comprising placing at least one bot at one or more virtual locations in a multi-dimensional virtual experience, at the one or more virtual locations: rotating a viewport of the at least one bot through one or more orientations, wherein the viewport provides, for display, a vantage of the multi-dimensional virtual experience from a virtual location and an orientation of the at least one bot; and at the one or more orientations, and for one or more objects located in the multi-dimensional virtual experience, determining a viewability of the one more objects, from the vantage of the at least one bot, via performance of an obstacle detection technique; and for the one or more objects, calculating a probabilistic viewability as a function of the determined viewability at the one or more virtual locations and the one or more orientations; and generating a data structure comprised of the probabilistic viewability of each of the one or more objects.

In some aspects, rotating the viewport of the at least one bot through one or more orientations comprises: placing the at least one bot at a first orientation and a second orientation of at least $\pi/2$ radians separation from the first orientation.

In some aspects, calculating the probabilistic viewability comprises: calculating a quotient of a number of instances in which the determined viewability indicates that the object is not viewable and a number of instances in which the determined viewability is measured.

In some aspects, the obstacle detection technique comprises a ray casting obstacle detection algorithm.

In some aspects, the data structure further comprises spatial telemetry data associated with a respective bot assigned to each of one or more virtual locations.

In some aspects, the method may further comprise transmitting, to a client device, at least a portion of the generated data structure.

In some aspects, at least one of the one or more objects cause is an impression comprising at least one virtual surface visible by an avatar interacting with the multi-dimensional virtual experience from at least one virtual location and at least one orientation.

In some aspects, the method may further comprise receiving, from a client device, a request to determine validity of the impression, the request comprising spatial telemetry data for an avatar associated with the client device, the avatar interacting in an instance of the multi-dimensional virtual experience executed on the client device; identifying, using the data structure, a probability that the impression is a valid impression; and outputting the probability that the impression is a valid advertising impression.

In some aspects, the method may further comprise receiving, from a client device, a request to determine a viewability of a particular object, the request comprising spatial telemetry data for an avatar associated with the client device, the avatar interacting in an instance of the multi-dimensional virtual experience executed on the client device; identifying, using the data structure, the viewability of the particular object from location and orientation specified by the spatial telemetry data; and outputting the viewability of the particular object.

In some aspects, the at least one bot is an automated bot comprising computer-executable instructions that, when executed by a computing device, cause the computing device to direct the automated bot to mimic behavior of an avatar within a multi-dimensional virtual experience.

In another aspect, a system is described, the system comprising a first device, comprising a first memory with first instructions stored thereon; and a first processing device, coupled to the first memory, the first processing device configured to access the first memory and execute the first instructions, wherein the first instructions cause the first processing device to perform operations comprising: assigning at least one bot to a multi-dimensional virtual experience; and for each of the one or more objects, calculating a probabilistic viewability of the one or more objects at one or more virtual locations; and generating a data structure comprised of the probabilistic viewability of the one or more objects from the one or more virtual locations; and a second device, comprising a second memory with second instructions stored thereon; and a second processing device, coupled to the second memory, the second processing device configured to access the second memory and execute the second instructions, wherein the second instructions cause the second processing device to perform operations comprising: identifying, using the data structure, a probability that an impression caused by at least one of the one or more objects is a valid impression; and outputting the probability that the impression is a valid impression.

In some aspects, the first instructions further cause the first processing device to perform operations comprising: at the one or more virtual locations, rotating a viewport of the at least one bot through one or more orientations, wherein the viewport provides, for display, a vantage of the multi-dimensional virtual experience from a virtual location and an orientation of the at least one bot.

In some aspects, rotating the viewport of the at the at least one bot through one or more orientations comprises rotating the viewport from a first orientation to a next orientation of at least $\pi/2$ radians separation from the first orientation.

In some aspects, calculating the probabilistic viewability comprises: calculating a quotient of a number of instances in which a viewability of at least one or the one more objects indicates that the object is not viewable and a number of instances in which the viewability is measured.

In some aspects, the obstacle detection technique comprises a ray casting obstacle detection algorithm.

In some aspects, the data structure further comprises spatial telemetry data associated with a respective bot assigned to each of one or more virtual locations.

In some aspects, the first instructions further cause the first processing device to perform operations comprising: transmitting, to the second device, at least a portion of the generated data structure.

In some aspects, at least one of the one or more objects cause an impression comprising at least one virtual surface visible by an avatar interacting with the multi-dimensional virtual experience from at least one virtual location and at least one orientation.

In some aspects, the at least one bot is an automated bot comprising computer-executable instructions that, when executed by a computing device, cause the computing device to direct the automated bot to mimic behavior of an avatar within a multi-dimensional virtual experience.

In another aspect, a non-transitory computer-readable medium is described with instructions stored thereon that, responsive to execution by a processing device, causes the processing device to perform operations comprising: assigning at least one bot to a multi-dimensional virtual experience, wherein assigning the at least one bot comprises:

wherein assigning the at least one bot comprises placing at least one bot at one or more virtual locations in a multi-dimensional virtual experience; at the one or more virtual locations: rotating a viewport of the at least one bot through one or more orientations, wherein the viewport provides, for display, a vantage of the multi-dimensional virtual experience from a virtual location and an orientation of the at least one bot; and at the one or more orientations, and for one or more objects located in the multi-dimensional virtual experience, determining a viewability of the one more objects, from the vantage of the at least one bot, via performance of an obstacle detection technique; and for the one or more objects, calculating a probabilistic viewability as a function of the determined viewability at the one or more virtual locations and the one or more orientations; and generating a data structure comprised of the probabilistic viewability of each of the one or more objects.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

BRIEF DESCRIPTION OF DRAWINGS

FIG. 2 is a flowchart of an example method to determine object viewability, in accordance with some implementations.

FIG. 7 is a flowchart of another example method to determine object viewability, in accordance with some implementations.

DETAILED DESCRIPTION

Figure 1:
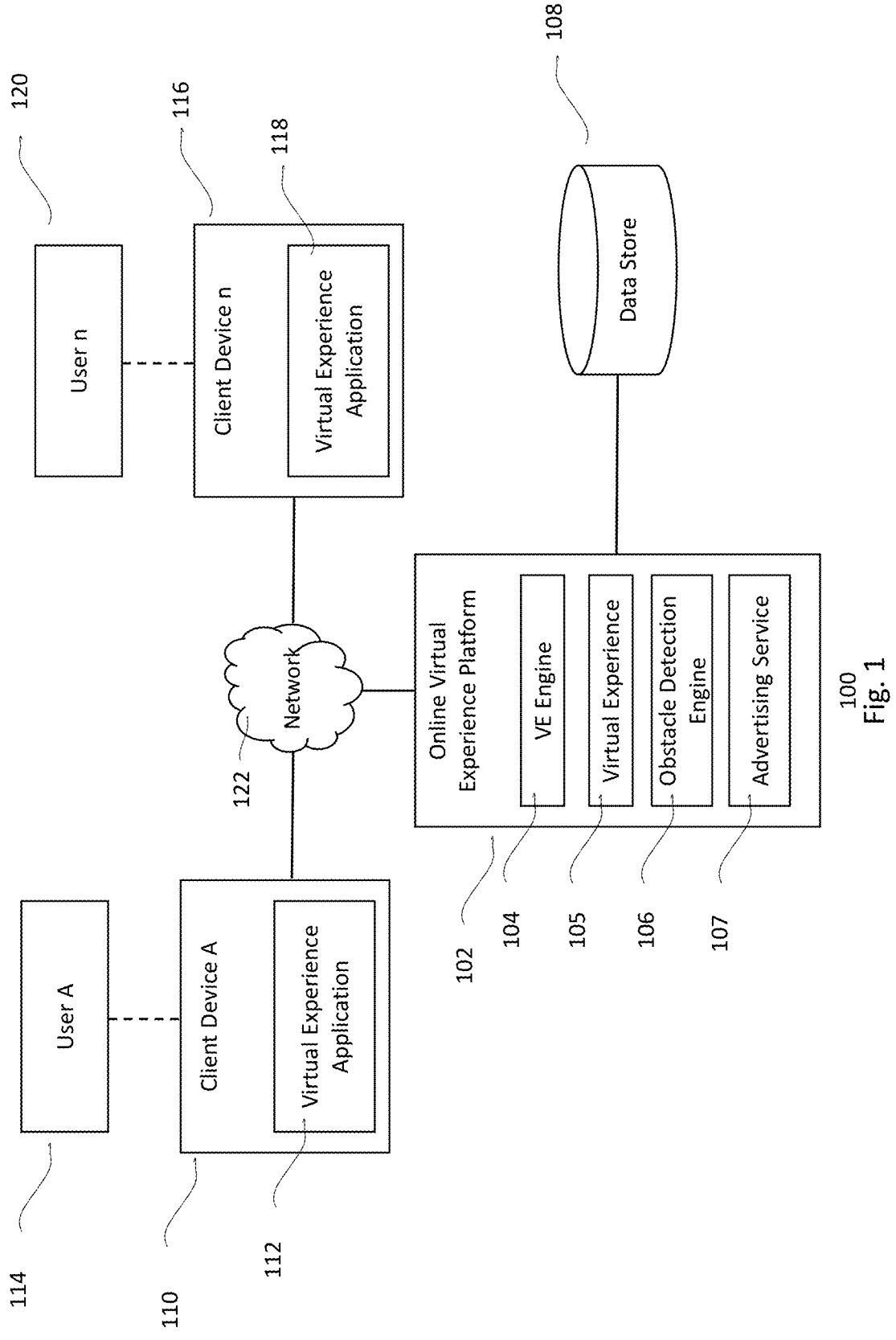
FIG. 1 is a diagram of an example network environment for determining object viewability within a multi-dimensional virtual experience, in accordance with some implementations.

Some implementations described herein relate to computing the viewability of an object in a multi-dimensional virtual experience. In some aspects, features described herein relate to the precomputation of the probabilistic viewability of one or more objects, such as for example, digital advertisements, in a multi-dimensional virtual experience at server and storing the data in a data structure, which may be sent to a client device, eliminating or reducing the need to perform resource intensive obstacle detection algorithms at the client device, which provides technical effects, advantages, and benefits including:

Improved Accuracy: Some aspects described herein improve obstacle detection processes that can be used in object viewability determinations. Improved accuracy can be effectuated due to decreased computational and timing restrictions.

Resource Efficiency: Some aspects described herein improve computational efficiency. For example, portions of resource intensive processing can take place at, for example, a server, and in some implementations, in advance, allowing the determination to be made at a device that may comprise lower computational power. This efficiency enables the adoption of these and other aspects across a broader range of devices, from high-end gaming computers to low-end mobile devices, thereby expanding the user base and potential advertising audience.

Scalability: Some aspects described herein improve the accuracy and efficiency of determining object viewability on low-end devices, enabling the platform to handle larger user volumes without sacrificing performance.

Increased Attractiveness to Advertisers: The enhanced accuracy of viewability calculations, combined with the ability to reach a broader user base, can make platforms more appealing to advertisers. The improved accuracy and larger user base increase the amount of viewability data and may allow advertisers to make more informed decisions about object placements, attracting more advertisers and increasing the monetization potential of the platform.

These technical effects, advantages, and benefits are directly related to the improved object viewability processes and other features described herein.

Through implementation of these and other features, players will experience increased playtime through less required computational resources and/or more accessibility through older, less powerful, and/or less expensive devices, overcoming many drawbacks of conventional, object viewability processes and obstacle detection methods.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations" or "some aspects", "an implementation" or "an aspect", "an example implementation" or "an example aspect", etc. indicate that the implementation or aspect described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be affected in connection with other implementations whether or not explicitly described.

It is noted that any use of user data to determine users' interests or any other purpose is specifically with permission from the user, in accordance with applicable regulations, and can be turned off by the user. User can also choose what data to permit for such use. User data is stored securely and in compliance with rules and laws. Furthermore, data collection is not performed in certain geo locales, for certain user categories (e.g., based on age or other demographic), is temporary (data are discarded after a period of time), and is stored securely even when only used temporarily. Moreover, user data are not shared with third-parties. Even further, some data may be anonymized, aggregated across users, or otherwise modified so that a specific user identity cannot be determined.

Hereinafter, further details surrounding example implementations and various aspects of this disclosure are described with reference the many figures.

FIG. 1: Example System Architecture

FIG. 1 illustrates an example network environment 100, in accordance with some implementations of the disclosure. FIG. 1 and the other figures use like reference numerals to identify like elements.

The network environment 100 (also referred to as a "platform" herein) includes an online virtual experience server 102, a data store 108, client device A 110, and in some implementations, client device N 116, all connected via a network 122.

The online virtual experience server 102 can include, among other things, a virtual experience (VE) engine 104, one or more virtual experiences 105, an obstacle detection engine 106, and an advertising service 107. The online virtual experience server 102 may be configured to provide virtual experiences 105 to one or more client devices 110 and 116, and to provide interactive digital advertisements via the advertising service 107, in some implementations.

Data store 108 is shown coupled to online virtual experience server 102 but in some implementations, can also be provided as part of the online virtual experience server 102. The data store may, in some implementations, be configured to store advertising data, user data, and/or other contextual data in association with the advertising service 107.

The client devices (e.g., client device A 110 and client device N 116) can include a virtual experience application (e.g., 112 and 118) and an I/O interface to interact with the online virtual experience server and to view, for example, graphical user interfaces (GUI) through a computer monitor or display (not illustrated). In some implementations, the client devices 110 and 116 may be configured to execute and display virtual experiences, as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. Data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., user 114 via client device A 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device A 110, respectively.

In some implementations, online virtual experience server 102 may include digital asset and digital virtual experience generation provisions. For example, the platform may provide single-player or multiplayer games and/or administrator interfaces allowing the design, modification, unique tailoring for individuals, and other modification functions. In some implementations, virtual experiences may include multi-dimensional games (e.g., two-dimensional (2D) games and three-dimensional (3D) games), virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device A 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device A 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device A 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device A 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices may be used.

In some implementations, each client device (e.g., client device A 110 and client device n 116) may include an instance of the virtual experience application (e.g., virtual experience application 112 and virtual experience application 118). The virtual experience application 112 may be rendered for interaction at the client device 110.

FIG. 2: Example Method of Computing Viewability

FIG. 2 is a flowchart of an example method 200 of computing a viewability of one or more objects located in a multi-dimensional virtual experience and generating a data structure comprising, in some implementations, results from those computations, in accordance with some implementations. FIG. 3 is a flowchart showing an example aspect of a portion 300 of the method 200 of FIG. 2.

In some implementations, method 200 may be implemented, for example, on online virtual experience server 102 described with reference to FIG. 1. In some implementations, some or all of the method 200 can be implemented on one or more client devices (e.g., client device A 110 and client device n 116) as shown in FIG. 1 or on one or more server device(s) (e.g., online virtual experience server 102), and/or on a combination of server device(s) and client device(s). In described examples, the implementing system includes one or more digital processors or processing circuitry ("processors"), and one or more storage devices (e.g., a database, data store 108, or other storage). In some implementations, different components of one or more servers and/or clients can perform different blocks or other parts of method 200. In some examples, the first device is described as performing blocks of method 200. Some implementations can have one or more blocks of method 200 performed by one or more other devices (e.g., other client devices or server devices) that can send results or data to the first device.

In some implementations, method 200, or portions of the methods, can be initiated automatically by a system. For example, the method (or portions thereof) can be periodically performed, or performed based on one or more particular events or conditions, e.g., whether there is more of a virtual experience left to analyze, whether all objects have been considered, a predetermined time period having expired since the last performance of method 200, periodic analysis based on advertiser preferences, and/or one or more other conditions occurring which can be specified in settings read by the method.

Figures 3A, 3B:
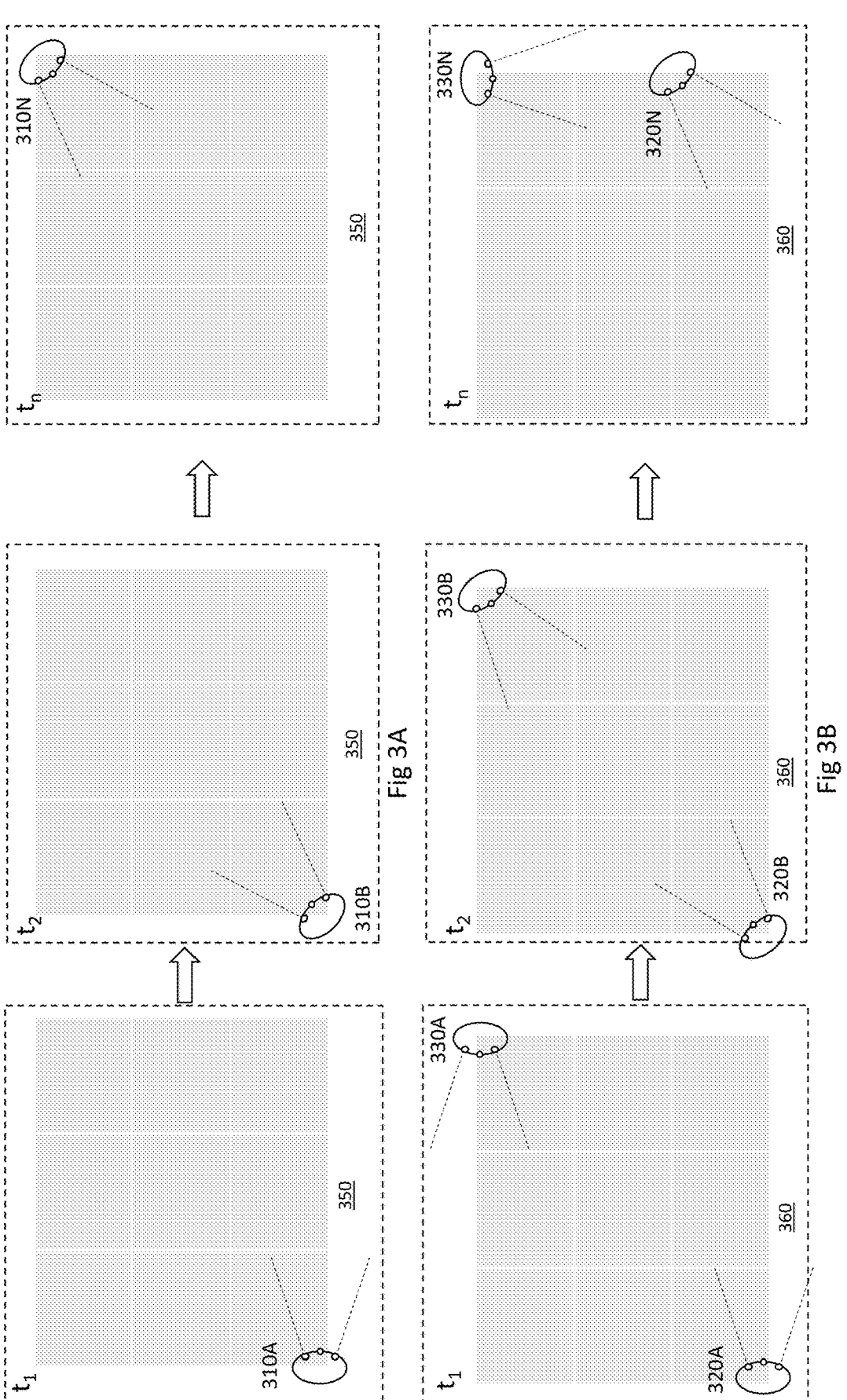
FIGS. 3A and 3B are diagrams showing placement of one or more bots to a multi-dimensional virtual experience, in accordance with some implementations.

Method 200 may begin at block 202. At block 202, at least one bot may be placed at one or more virtual locations in the multi-dimensional virtual experience. For example, one or more server device(s) (e.g., online virtual experience server 102) may be configured to assign at least one bot to a multi-dimensional virtual experience and place the at least one bot at a first virtual location. Virtual locations may be defined by cartesian coordinates (e.g., (x, y) for a two-dimensional virtual experience or, for example, (x, y, z) for a three-dimensional virtual experience). In an exemplary aspect, as shown in FIGS. 3A and 3B, bots may be assigned to multi-dimensional virtual experiences 250 and 260 respectively. More specifically, FIG. 3A shows an exemplary embodiment in which a single bot 310 (depicted as 310A at $t_1$, 310B at $t_2$, and 310N at $t_N$) may be placed, assigned, or otherwise implemented in a multi-dimensional virtual experience, whereas FIG. 3B shows an exemplary embodiment in which multiple bots (i.e., 320 and 330, shown as 320A and 330A at $t_1$, 320B and 330B at $t_2$, and 320N and 330N at $t_N$) may be placed, assigned, or otherwise implemented in a multi-dimensional virtual experience.

In some implementations, a bot may mimic or attempt to mimic the behavior of an avatar. A bot may be an automated bot comprising computer-executable instructions that, when executed by a computing device, cause the computing device to direct the automated bot to mimic behavior of an avatar within a multi-dimensional virtual experience. In other implementations, the computer-executable instructions, when executed by a computing device, cause the computing device to direct the automated bot to traverse the a multi-dimensional virtual experience in an predefined path, for example, such that the automated bot is placed at a first virtual location, is directed to make one more viewability determinations, is rotated such that the viewport of the automated bot is rotated along one or more axis by a predefined amount, is instructed to make additional viewability determinations at one or more of the orientations, is then instructed to move to second virtual location to repeat the process from the second virtual location, and then instructed to move to continue to moving to n virtual locations. In some implementations, the placing and/or moving of the automated bot is a systematic, predetermined path, whereas in other implementations, the placement and/or movement of the automated bot is random. In some example implementations, online virtual experience server 102, for example, using virtual experience engine 104, may include, employ, instruct, or otherwise direct, one or more processes for utilizing automated bots. In an example embodiment, data indicative of a set of builds may be received or accessed, executed on a server, and then populated with one or more bots. Data may then be captured and/or reported to the online virtual experience server 102. In some example implementations, data may be reported for real-time created content (RCC), headless clients, and mobile phones and desktops. In some embodiments, data may then be captured and/or reported on a reoccurring basis, on a specific place, for example, within a virtual environment, on a set of builds, and based on flags or indicators. In some embodiments, processes may be utilized for detecting changes, what the changes are, and how the changes impact previous data and/or metrics derived from the previous data.

Block 202 may be followed by block 204.

At block 204, a viewport of the at least one bot may be rotated through one or more orientations, at the one or more virtual locations. For example, as shown in FIG. 3A, the viewport of bot 310 is rotated 45 degrees at $t_2$ from the orientation at $t_1$. In some aspects, a viewport of a bot may be rotated a predefined amount in each of one or more prespecified directions. For example, in some aspects, rotating the viewport through one or more orientations may include rotating the viewport through a plurality of different orientations from, for example, a first orientation, to a next orientation of, for example, at least $\pi/2$ radians separation from the first orientation.

Block 204 may be followed by block 206.

Figures 4A, 4B, 4C:
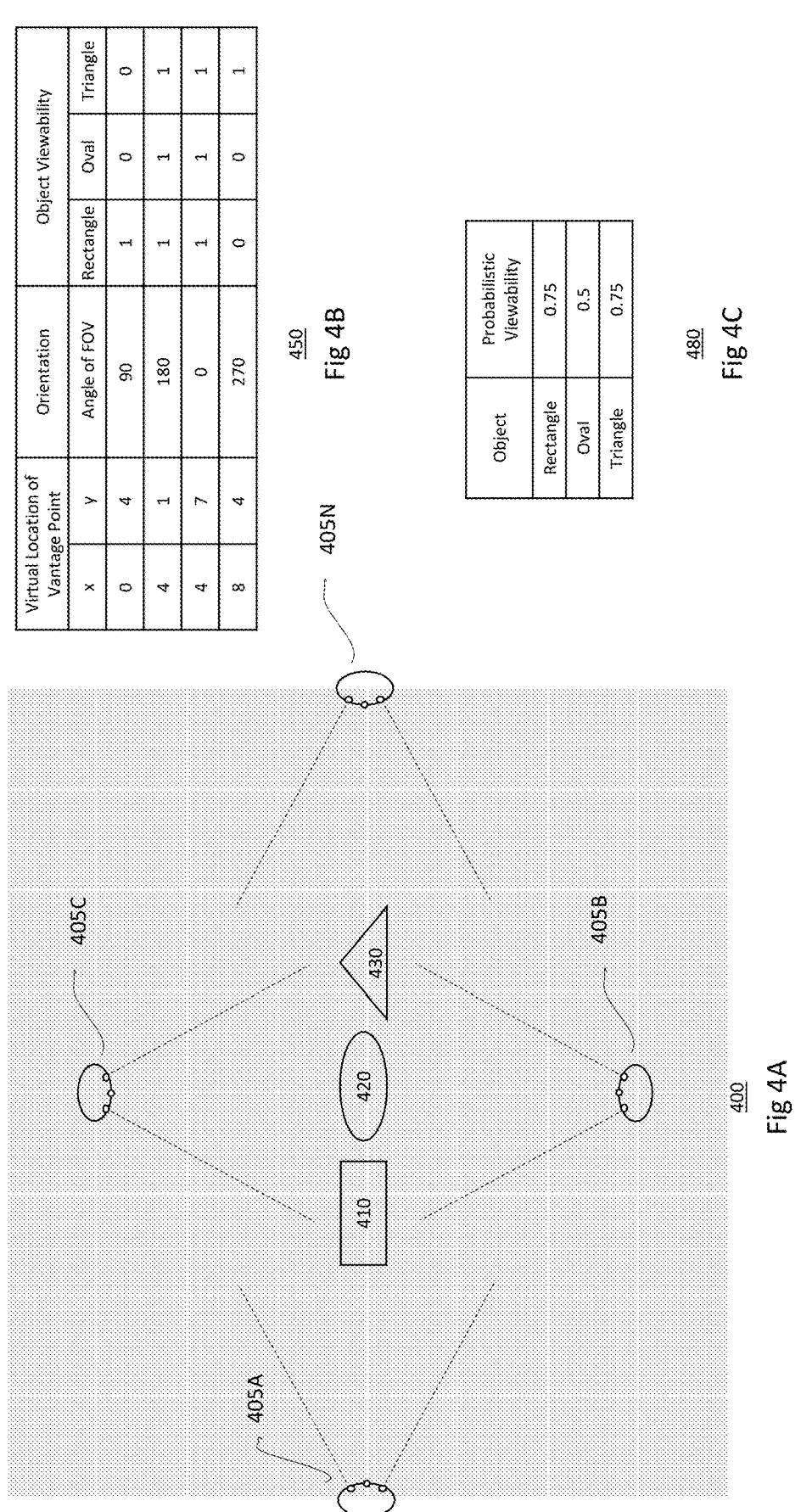
FIG. 4A is a diagram showing an example embodiment of determining object, in accordance with some implementations.
FIGS. 4B and 4C are diagrams showing exemplary data structures, in accordance with some implementations.

At block 206, a viewability of the one or more objects located in the multi-dimensional virtual experience may be determined, for example, via performance of an obstacle detection technique. For example, FIG. 4A shows a plurality of bots at various virtual locations and orientations, which may but not necessarily, be one or more distinct bots at different times, or a single bot at a plurality of distinct times). Here, the viewability of, for example, three objects may be determined from, for example, the four arbitrary virtual locations and orientations of bot 405. However, as one of ordinary skill would appreciate, viewability may be determined similarly for any number of objects, from any number of virtual locations, at any number of orientations. Each viewability determination is a deterministic viewability, meaning that the viewability determination remains the same for each set of virtual locations and orientations.

The one or more objects may be, for example, any elements in the multi-dimensional virtual experience. In some aspects, the one or more objects may be or include an virtual camera that, for example, captures a picture of an avatar that looks at it. In another aspect, the one or more objects may include an avatar that, for example, stops moving or the like when viewed. In some aspects, at least one of the one or more objects is a virtual advertisement. In some aspects, at least one or more of the objects may be a different point of interest. In some aspects, an object is sized such that it occupies a plurality of 1×1 studs. In such aspects, viewability may be determined for each stud. In some aspects a deterministic viewability may be based on a predefined portion of the plurality of studs being viewable. In some aspects, viewability may be set to require a threshold amount (e.g., percentage of 5%) of a screen or viewport, for example, to be considered viewable. In some embodiments, additionally, a viewing angle may also be considered (e.g., <55 degrees), and any objects outside of the viewing angle may not be considered viewable.

In some aspects, the obstacle detection technique described above is, or comprises, a ray-casting or ray tracing obstacle detection algorithm. For example, from the virtual location (e.g., the coordinates) of a viewport (e.g., a virtual location of an avatar, and in some aspects, orientation), a ray is cast, the ray comprising a plurality of coordinates, for example, in a straight line originated from the viewport of the avatar. The coordinates of the ray are checked, for example, on a step-by-step (or point-by-point) basis starting at the originating point against locations of other objects. If the coordinates of the ray and the coordinates of an objects match, the match is considered a detection of an object (e.g., the object is viewable from the virtual location of the avatar). In some aspects, the process is continued on a point-by-point basis until an object is detected or a threshold distance is met.

Block 206 may be followed by block 208.

At block 208, a probabilistic viewability for the one or more objects may be calculated. A probabilistic viewability is based on a probability an object is viewable from, for example, a particular virtual location and a particular orientation. In some aspects, the probabilistic viewability is calculated by calculating a quotient of a number of instances in which the determined viewability indicates that the object is not viewable and a number of instances in which the determined viewability is measured.

Block 208 may be followed by block 210.

At block 210, one or more data structures may be generated. For example, in some aspects, as shown in FIG. 4B, a data structure that comprises a deterministic viewability (i.e., 0 or 1) of the one or more objects from the one or more virtual locations at the one or more orientations may be generated. For example, at the virtual location (0,4) at an orientation of 90 degrees, the rectangle object is viewable and as such, a Boolean value of 1 is assigned to the virtual location and orientation pair for that object. The data structure may be generated such that a tuple comprising at least the virtual location, the orientation, identification data of an object, and the deterministic viewability of the object at the virtual location and orientation.

In some aspects, as shown in FIG. 4C, a data structure comprised of a probabilistic viewability of the one or more objects, or a subset of the one or more objects, may be generated. Example data structures may include tables, arrays, matrices, vectors, etc.

In some aspects, the data structure may be comprised of results from each of a plurality of bots, or in other aspects, based on the results of a subset of bots, including one or more bots. In some aspects, the data structure may be comprised of results from, for example, a plurality of virtual locations, such as a predetermined or predefined set of virtual locations. In some aspects, the data structure may be generated based on the results of a subset of the plurality of virtual locations. In some aspects, the data structure further comprises spatial telemetry data associated with a respective bot, for example, assigned to each of one or more virtual locations.

Block 210 may be followed by block 212.

At block 212, at least a portion of one or more data structures are transmitted to a client device. Also, or alternatively, at least a portion of the one or more data structures may be retained and stored at the online virtual experience platform 102, data store 108, or the like. Portions may be retained at the online virtual experience platform 102, data store 108, or the like, and transmitted to, for example, a client device in portions, for example, based on characteristics or qualities of the client device (e.g., memory), the network (e.g., available bandwidth), and/or an avatar (e.g., location within the multi-dimensional virtual experience).

Blocks 202-212 can be performed (or repeated) in a different order than described above and/or one or more blocks can be omitted. Furthermore, portions of the methods 200 and 300 may be combined and performed in sequence or in parallel, according to any desired implementation.

Figure 5:
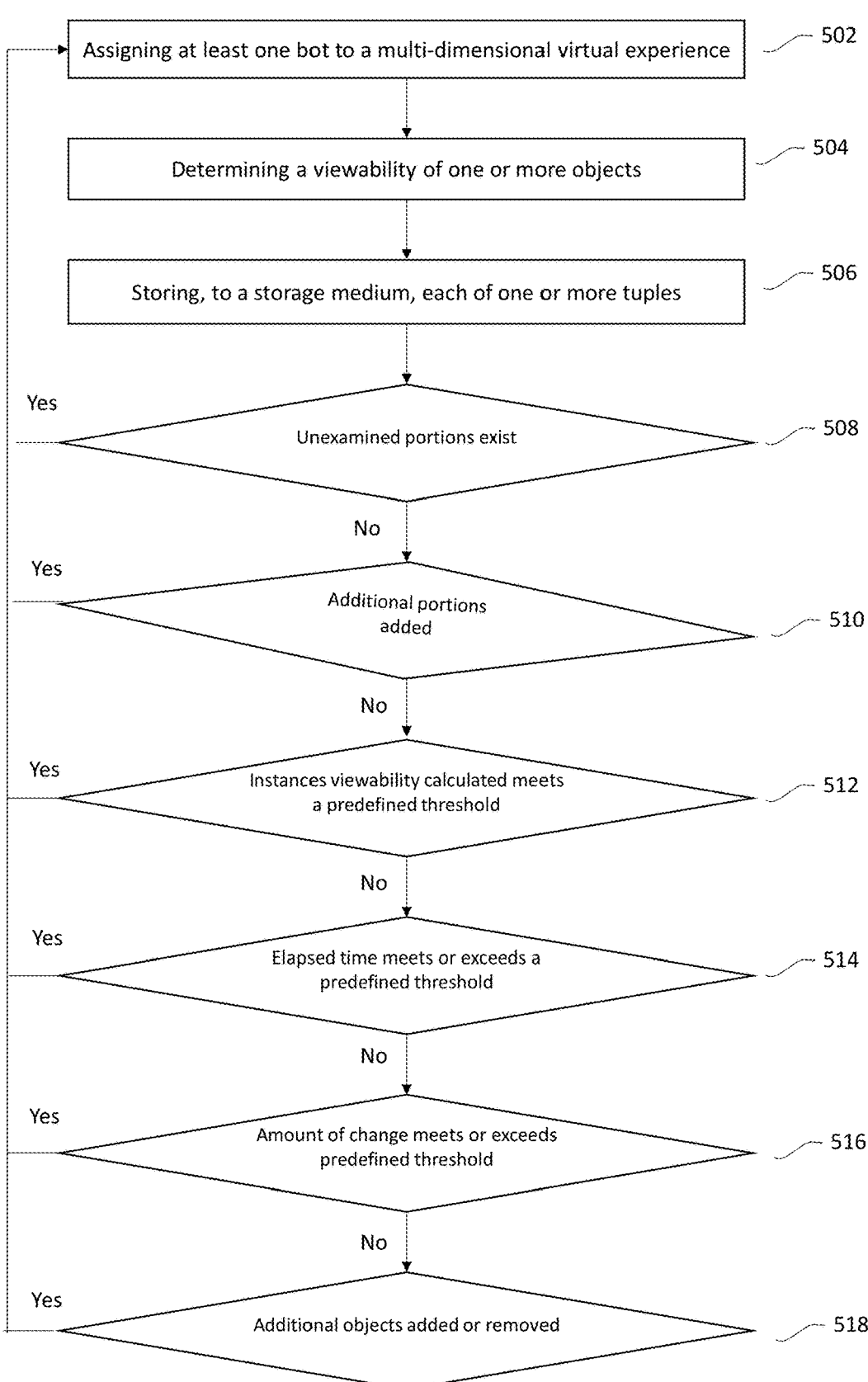
FIG. 5 is a flowchart of another example method to determine object viewability, in accordance with some implementations.

FIG. 5: Example Method to Determine Object Viewability

FIG. 5 is a flowchart of an example method, in accordance with some implementations. In particular, FIG. 5 shows an example method for predetermining a viewability of one or more objects in a multi-dimensional virtual experience and storing data, in for example, tuples, indicating viewability of particular objects from particular virtual locations and orientations.

In some implementations, method 500 may be implemented, for example, on online virtual experience server 102 described with reference to FIG. 1. In some implementations, some or all of method 500 can be implemented on one or more client devices (e.g., client device A 110) as shown in FIG. 1, or on online virtual experience server 102, and/or on a combination of server device(s) and client device(s). In described examples, the implementing system includes one or more digital processors or processing circuitry ("processors"), and one or more storage devices (e.g., a database, data store 108, or other storage). In some implementations, different components of one or more servers and/or clients can perform different blocks or other parts of the method 200. In some examples, a first device is described as performing blocks of method 200. Some implementations can have one or more blocks of method 500 performed by one or more other devices (e.g., other client devices or server devices) that can send results or data to the first device.

Blocks 502-518 can be performed (or repeated) in a different order than described above and/or one or more blocks can be omitted. Methods 500 and 600 can be performed on a server (e.g., online virtual experience server 102) and/or a client device (e.g., client device A 110). Furthermore, portions of the method 500 may be combined and performed in sequence or in parallel, according to any desired implementation.

At block 502, at least one bot may be assigned to a multi-dimensional virtual experience.

Block 504 may follow block 502. At block 504, a viewability is determined, for example, at one or more orientations, and for one or more objects located in the multi-dimensional virtual experience, for example, via performance of an obstacle detection technique. In some aspects, the viewability is stored as a Boolean value. In some aspects, the obstacle detection technique comprises ray casting to every 1 stud×1 stud grid of each of the one or more objects. In some aspects, the obstacle detection technique comprises ray casting to at least one stud of each of the one or more objects.

Block 504 may be followed by block 506. At block 506, each of one or more tuples may be stored, for example, in a data structure, such as, in some aspects, data structure 450, or the like. The data structure may be stored to a storage medium (e.g., a database, data store 108, or other accessible storage.) In some aspects, each of the one or more tuples may comprise one or more of (i) data identifying at least one virtual location, (ii) data identifying at least one orientation, (iii) data indicative of at least one object, and (iv) the viewability captured from, for example, the obstacle detection technique, at the at least one virtual location and the at least one virtual orientation. Block 506 may be followed by block 508.

At block 508, the existence of one or more unexamined portions is determined. In an instance in which one or more unexamined portions of the multi-dimensional virtual experience do exist, the method may return to block 502 where, for example, the assigning step may include assigning each of one or more bots to a respective, unexamined portion of the multi-dimensional virtual experience. Block 508 may be followed by block 510.

At block 510, the existence of any additional portions of the multi-dimensional virtual experience for example, since the one or more bots were previously assigned to the multi-dimensional virtual experience is determined. And in an instance in which one or more additional portions of the multi-dimensional virtual experience have been added, the method may return to block 502 where, for example, the assigning step may include assigning each of one or more bots to one or more additional virtual locations of the multi-dimensional virtual experience. Block 510 may be followed by block 512.

At block 512, a number of instances that a probabilistic viewability of one or more objects located in the multi-dimensional virtual experience has been calculated may be determined to have met a predefined threshold. And in an instance in which the number of instances that the probabilistic viewability of one or more objects located in the multi-dimensional virtual experience has been calculated does not meet a predefined threshold, the method may return to block 502 where, for example, the assigning step may include assigning at least one bot to a multi-dimensional virtual experience, for example, to determine the probabilistic viewability of one or more objects located in the multi-dimensional virtual experience. Block 512 may be followed by block 514.

At block 514, an elapsed time, for example, since one or more bots were previously assigned or since a previous calculation of the probabilistic viewability of at least one of the each of one or more objects is determined to have met or exceeded a predefined threshold. And in in an instance in which the elapsed time, for example, since one or more bots were previously assigned or since the previous calculation of the probabilistic viewability of at least one of the each of one or more objects does exceed a predefined threshold, the method may return to block 502 where, for example, the assigning step may include assigning at least one bot to a multi-dimensional virtual experience. Block 514 may be followed by block 516.

At block 516, the existence of one or more changes to the multi-dimensional virtual experience may be determined or the existence of changes to the multi-dimensional virtual experience having met or exceeded a predefined threshold amount of change may be determined. In an instance in which that the multi-dimensional virtual experience has changed or that method determines that the changes to the multi-dimensional virtual experience exceed a predefined threshold amount of change, the method may return to block 502 where, for example, the assigning step may include assigning at least one bot to a multi-dimensional virtual experience. Block 516 may be followed by block 518.

At block 518, the existence of additional objects having been added, located, or in some aspects, removed from the multi-dimensional virtual experience may be determined. And in an instance in which one or more additional objects are located in, have been added, or have been removed from the multi-dimensional virtual experience, the method may return to block 502 where, for example, the assigning step may include assigning at least one bot to a multi-dimensional virtual experience.

In some implementations, method 500 can be initiated automatically by a system. For example, the method (or portions thereof) can be periodically performed, or performed based on one or more particular events or conditions, e.g., as will be described below, whether there are addition locations of the virtual experience left to analyze, whether addition locations of the virtual experience are added to analyze, whether all objects have been considered, whether a predetermined time period has elapsed or expired since the last performance of method 500, whether periodic analysis is required based on advertiser preferences, and/or one or more other conditions occurring which can be specified in settings read by the method.

Figure 6:
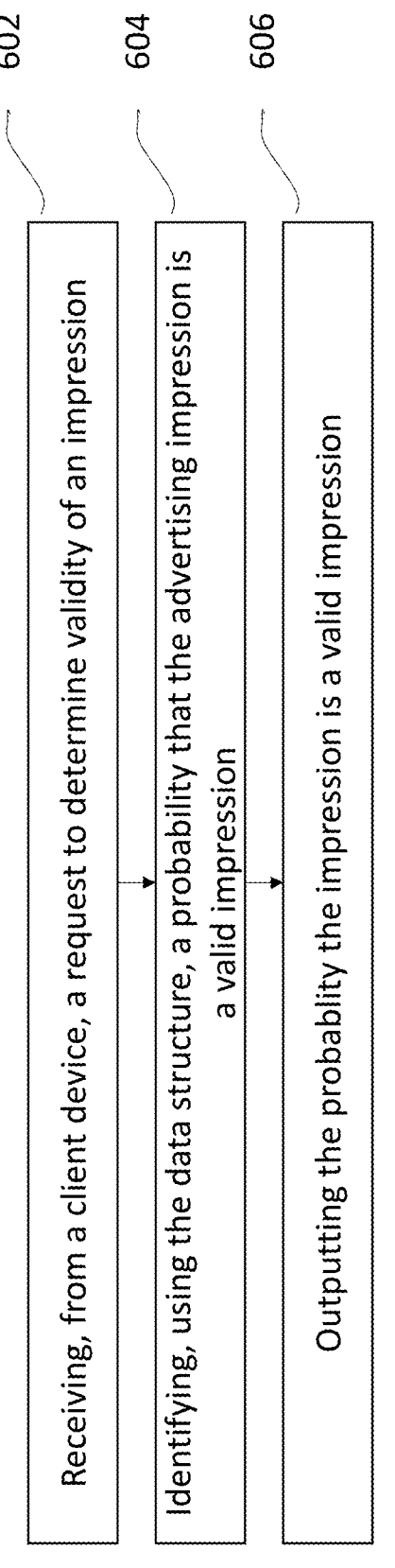
FIG. 6 is a flowchart of an example method to provide object viewability, in accordance with some implementations.

FIG. 6: Example Method of Identifying Validity of an Impression

FIG. 6 is a flowchart of an example method to identify the validity of an impression or the probability that an impression is valid using the data structure, in accordance with some implementations. In some implementations, method 600 can be implemented, for example, on online virtual experience server 102 or client device A 110 described with reference to FIG. 1. In some implementations, some or all of the method 400 can be implemented, for example, on a server system, e.g., online virtual experience server 102 as shown in FIG. 1. In some implementations, some or all of the method 400 can be implemented on a system such as one or more client devices 110 and 116 as shown in FIG. 1 or on online virtual experience server 102, and/or on a combination of server system device(s) and one or more client device(s). In some aspects, the implementing system includes one or more digital processors or processing circuitry, ("processors"), and one or more storage devices such as (e.g., a database, data store 108, or other accessible storage.). In some implementations, different components of one or more servers and/or clients can perform different blocks or other parts of method 600. In some examples, a first device is described as performing blocks of method 600. Some implementations can have one or more blocks of method 400 performed by one or more other devices (e.g., other client devices or server devices) that can send results or data to the first device.

Method 600 may begin at block 602.

At block 602, a request to determine an advertising impression for the virtual advertisement may be received. The request may include data identifying one or more impressions that validity is requested and/or data identifying one or more objects causing the impression. In some aspects, the request may include virtual location data and/or orientation data of the avatar identifying the virtual location and/or orientation of the avatar from which the validity of the impression is requested.

Block 602 may be followed by block 404.

At block 604, a probability that the advertising impression is a valid advertising impression is identified or otherwise determined using the data structure. In some aspects, the probability that the advertising impression is a valid advertising impression is identified or otherwise determined using the portion of the one or more data structures, for example, that may have been previously transmitted to the client device or is being transmitted to the client device.

In some aspects, validity may be determined as a function, for example, of virtual location data and/or orientation data received in the request. For example, in some aspects, the request may include a virtual location and/or an orientation. The validity determination may then use the virtual location data and/or orientation data to identify, from the data structure, a viewability of a particular object from the virtual location and/or orientation specified by the virtual location data and/or orientation data. For example, in an aspect in which the viewability data is a Boolean value, a Boolean value of 1 may indicate that the probability that impression is a valid impression is 1 or 100%, whereas a Boolean value of 0 may indicate that the probability that the impression is a valid impression is 0 or 0%.

In another aspect, the probability that an impression is a valid impression may be determined as a function of the probabilistic viewability of an object. For example, the request may or may not include virtual location data and/or orientation data. Regardless, in one aspect, the probability determination may identify, from a data structure (e.g., a data structure that includes one or more objects and an associated probabilistic viewability of the one or more objects), the associated probabilistic viewability of the particular object or objects included in the request. A probability determination may then be equal to the probabilistic viewability stored and/or accessed from the data structure.

In another aspect, the probability determination may compare the probabilistic viewability stored and/or accessed from the data structure with a predefined threshold. For example, if the probabilistic viewability is 0.5 and a predefined threshold is 0.75, the probability determination may indicate that the probability that the impression is a valid impression is 0 or 0%. Whereas, if the probabilistic viewability is 0.75 and a predefined threshold is 0.5, the probability determination may indicate that the probability that impression is a valid impression is 1 or 100%.

In some aspects, a determination on which above aspect is used to determine validity of an impression may be a function of whether the request includes virtual location data and/or orientation data of an avatar. For example, if a request does include virtual location data and/or orientation data, a subsequent validity determination may utilize the virtual location data and/or orientation data to identify a deterministic viewability (i.e., a viewability of the impression from the virtual location and/or orientation specified by the virtual location data and/or orientation data), whereas if a request does not include virtual location data and/or orientation data, a subsequent validity determination may identify a probabilistic viewability of a particular object identified in the request.

Block 404 may be followed by block 406.

At Block 606, the probability that the advertising impression is a valid advertising impression is output.

Blocks 602-606 can be performed (or repeated) in a different order than described above and/or one or more blocks can be omitted. Furthermore, portions of the method 400 may be combined and performed in sequence or in parallel, according to any desired implementation.

FIG. 7: Example Method to Determine Object Viewability by an Avatar

FIG. 7 is a flowchart of an example method to directed to determining whether a particular object is viewable by an avatar located at a particular virtual location from a particular orientation, in accordance with some implementations.

In some implementations, method 700 can be implemented, for example, on online virtual experience server 102 described with reference to FIG. 1. In some implementations, some or all of the method 700 can be implemented on one or more client devices (e.g., client device A 110) as shown in FIG. 1, or on one or more server device(s) (e.g., online virtual experience server 102), and/or on a combination of server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of method 700. In some examples, a first device is described as performing blocks of method 700. Some implementations can have one or more blocks of method 700 performed by one or more other devices (e.g., other client devices or server devices) that can send results or data to the first device.

Method 700 may begin at block 702.

As shown in Block 702, a request may be received as to whether the particular object is viewable by the avatar located at a particular virtual location and from a particular orientation. The request may comprise data identifying one or more impressions for which viewability is requested and/or data identifying one or more objects causing the impression. In some aspects, the request may also include virtual location data and/or orientation data of the avatar identifying the virtual location and/or orientation of the avatar from which the viewability of the impression is requested.

Block 702 may be followed by block 704.

As shown in Block 704, one or more tuples that comprise data indicative of the particular object is selected from among the one or more tuples. In some aspects, each of the one or more tuples that comprise data indicative of the particular object is selected from among the one or more tuples.

Block 704 may be followed by block 706.

As shown in Block 706, one or more tuples comprised of data indicative of virtual location data, for example, identifying a virtual location at or closest to the particular virtual location identified by the virtual location data included in the request may be selected, for example, from among the one or more tuples or from among the one or more tuples that comprise data indicative of the particular object.

Block 706 may be followed by block 708.

As shown in Block 708, one or more tuples, or in some aspects, the tuple comprised of the orientation data identifying orientation data at or closest to the particular orientation identified by the orientation data included in the request may be selected from among the one more tuples or in some aspects from the one or more tuples that comprise one or both of the data indicative of the particular object and the location data indicative of the particular location from which viewability is requested.

Block 708 may be followed by block 710.

As shown in Block 710, the viewability of the tuple is returned. For example, subsequent to the performance of the steps identified in one or more of blocks 704, 706, and 708, the determination has identified a tuple comprised of data indicative of the object specified in the request, location data indicative of the location specified in the request, and orientation data indicative of the orientation specified in the request, and then accesses, extracts, or otherwise identifies and returns the viewability data also included in the tuple.

Blocks 702-710 can be performed (or repeated) in a different order than described above and/or one or more blocks can be omitted. Method 400 can be performed on a server (e.g., online virtual experience server 102) and/or a client device (e.g., client device A 110). Furthermore, portions of method 700 may be combined and performed in sequence or in parallel, according to any desired implementation.

Hereinafter, a more detailed description of various computing devices that may be used to implement different devices and/or components illustrated in FIG. 1 is provided with reference to FIG. 8.

Figure 8:
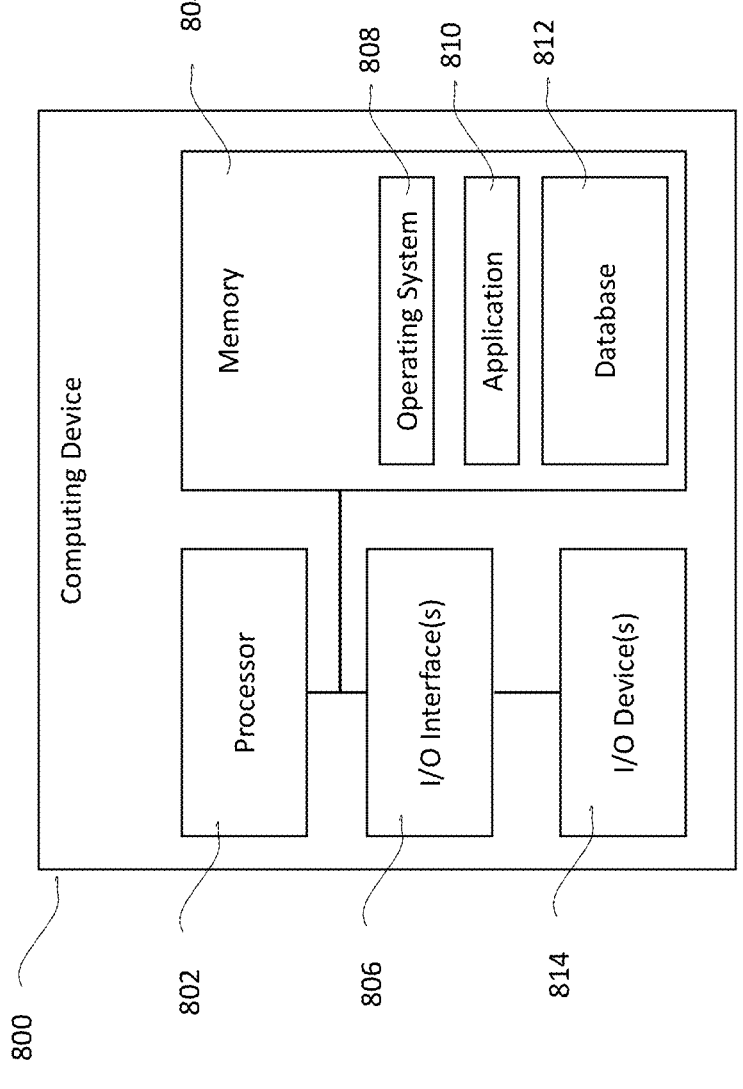
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., online virtual experience server 102 or client device A 110 of FIG. 1), and perform operations as described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, headphones, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the device 800 by the processor 802, including an operating system 808, software application 810 and database 812. In some implementations, application 810 can include instructions that enable processor 802 to perform the functions described herein, e.g., some or all of the methods of FIGS. 2-7. Software application 810 may include some or all of the functionality required to present interactive digital advertisements. In some implementations, one or more portions of software application 810 may be implemented in dedicated hardware such as an application-specific integrated circuit (ASIC), a programmable logic device (PLD), a field-programmable gate array (FPGA), a machine learning processor, etc. In some implementations, one or more portions of software application 810 may be implemented in general purpose processors, such as a central processing unit (CPU) or a graphics processing unit (GPU). In various implementations, suitable combinations of dedicated and/or general purpose processing hardware may be used to implement software application 810.

For example, software application 810 stored in memory 804 can include instructions for an application 810 that can provide improved methods for determining, for example, by probabilistic or deterministic operations, that a particular object, such as an advertisement, is viewable by an avatar in a multi-dimensional virtual experience. Any software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the device 800 with other systems and devices. For example, network communication devices, storage devices (e.g., memory and/or data store 108), and input/output devices can communicate via I/O interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, operating system 808, application 810, and database 812. These blocks may represent one or more processors or processing circuitries, operating systems, memories, I/O interfaces, applications, and/or software modules. In other implementations, computing device 800 may not have all of the components shown and/or may have other elements including other types of elements instead of, or in addition to, those shown herein. While online virtual experience server 102 are described as performing operations as described in some implementations herein, any suitable component or combination of components of online virtual experience platform 102, or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 200-700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In situations in which certain implementations discussed herein may obtain or use user data (e.g., user demographics, user behavioral data on the platform, user contextual data, user settings for advertising, etc.), users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method for determining object viewability, the method comprising:
placing at least one bot at one or more virtual locations in a multi-dimensional virtual experience;
at each of the one or more virtual locations:
rotating a viewport of the at least one bot through one or more orientations, wherein the viewport provides, for display, a vantage of the multi-dimensional virtual experience from the virtual location and each of the one or more orientations of the at least one bot; and
at the one or more orientations, and for one or more objects located in the multi-dimensional virtual experience, determining a viewability of the one more objects, from the vantage of the at least one bot, via performance of an obstacle detection technique comprising a ray casting obstacle detection algorithm; and
for the one or more objects, calculating a probabilistic viewability as a function of the determined viewability at the one or more virtual locations and the one or more orientations; and
generating a data structure comprised of the probabilistic viewability of the one or more objects.

2. The method of claim 1, wherein rotating the viewport of the at least one bot through one or more orientations comprises:
placing the at least one bot at a first orientation and a second orientation of at least $\pi/2$ radians separation from the first orientation.

3. The method of claim 1, wherein calculating the probabilistic viewability comprises:
calculating a quotient of a number of instances in which the determined viewability indicates that the object is not viewable and a number of instances in which the determined viewability is measured.

4. The method of claim 1, wherein the data structure further comprises spatial telemetry data associated with a respective bot assigned to each of one or more virtual locations.

5. The method of claim 1, further comprising:
transmitting, to a client device, at least a portion of the generated data structure.

6. The method of claim 1, wherein at least one of the one or more objects cause an impression comprising at least one virtual surface visible by an avatar interacting with the multi-dimensional virtual experience from at least one virtual location and at least one orientation.

7. The method of claim 6, further comprising:
receiving, from a client device, a request to determine validity of the impression, the request comprising spatial telemetry data for the avatar, wherein the avatar is associated with the client device, the avatar interacting in an instance of the multi-dimensional virtual experience executed on the client device;
identifying, using the data structure, a probability that the impression is a valid impression; and
outputting the probability that the impression is the valid impression.

8. The method of claim 6, further comprising:
receiving, from a client device, a request to determine a viewability of a particular object, the request comprising spatial telemetry data for the avatar, wherein the avatar is associated with the client device, the avatar interacting in an instance of the multi-dimensional virtual experience executed on the client device;
identifying, using the data structure, the viewability of the particular object from a location and an orientation specified by the spatial telemetry data; and
outputting the viewability of the particular object.

9. The method of claim 1, wherein the at least one bot is an automated bot comprising computer-executable instructions that, when executed by a computing device, cause the computing device to direct the automated bot to mimic behavior of an avatar within the multi-dimensional virtual experience.

10. A system comprising:
a first device, comprising:
a first memory with first instructions stored thereon; and a first processing device, coupled to the first memory, the first processing device configured to access the first memory and execute the first instructions, wherein the first instructions cause the first processing device to perform operations comprising:

placing at least one bot at one or more virtual locations in a multi-dimensional virtual experience;

for each of one or more objects located in the multi-dimensional virtual experience, calculating a probabilistic viewability of the one or more objects at the one or more virtual locations; and generating a data structure comprised of the probabilistic viewability of the one or more objects from the one or more virtual locations; and a second device, comprising:

a second memory with second instructions stored thereon; and a second processing device, coupled to the second memory, the second processing device configured to access the second memory and execute the second instructions, wherein the second instructions cause the second processing device to perform operations comprising:

identifying, using the data structure, a probability that an impression caused by at least one of the one or more objects is a valid impression; and outputting the probability that the impression is the valid impression.

11. The system of claim 10, wherein the first instructions further cause the first processing device to perform operations comprising:

at the one or more virtual locations, rotating a viewport of the at least one bot through one or more orientations, wherein the viewport provides, for display, a vantage of the multi-dimensional virtual experience from a virtual location and each of the one or more orientations of the at least one bot.

12. The system of claim 11, wherein rotating the viewport of the at the least one bot through the one or more orientations comprises rotating the viewport from a first orientation to a next orientation of at least $\pi/2$ radians separation from the first orientation.

13. The system of claim 10, wherein calculating the probabilistic viewability comprises:

calculating a quotient of a number of instances in which a viewability of at least one of the one or more objects indicates that the object is not viewable and a number of instances in which the viewability is measured.

14. The system of claim 11, wherein the first instructions cause the first processing device to perform further operations comprising:

at the one or more orientations, and for the one or more objects located in the multi-dimensional virtual experience, determining a viewability of the one more objects, from the vantage of the at least one bot.

15. The system of claim 10, wherein the data structure further comprises spatial telemetry data associated with a respective bot placed at each of the one or more virtual locations.

16. The system of claim 10, wherein the first instructions further cause the first processing device to perform operations comprising:

transmitting, to the second device, at least a portion of the generated data structure.

17. The system of claim 10, wherein at least one of the one or more objects cause an impression comprising at least one virtual surface visible by an avatar interacting with the multi-dimensional virtual experience from at least one virtual location and at least one orientation.

18. The system of claim 10, wherein the at least one bot is an automated bot comprising computer-executable instructions that, when executed by the first processing device, cause the first processing device to direct the automated bot to mimic behavior of an avatar within a multi-dimensional virtual experience.

19. A non-transitory computer-readable medium with instructions stored thereon that, responsive to execution by a processing device, causes the processing device to perform operations comprising:

assigning at least one bot to a multi-dimensional virtual experience, wherein assigning the at least one bot comprises:

placing at least one bot at one or more virtual locations in a multi-dimensional virtual experience;

at each of the one or more virtual locations:

rotating a viewport of the at least one bot through one or more orientations, wherein the viewport provides, for display, a vantage of the multi-dimensional virtual experience from the virtual location and each of the one or more orientations of the at least one bot; and at the one or more orientations, and for one or more objects located in the multi-dimensional virtual experience, determining a viewability of the one more objects, from the vantage of the at least one bot, via performance of an obstacle detection technique comprising a ray casting obstacle detection algorithm; and for the one or more objects, calculating a probabilistic viewability as a function of the determined viewability at the one or more virtual locations and the one or more orientations; and generating a data structure comprised of the probabilistic viewability of each of the one or more objects.

* * * * *